(12) United States Patent
Berdy et al.

(10) Patent No.: US 10,425,242 B2
(45) Date of Patent: Sep. 24, 2019

(54) IOT PROVISIONING SERVICE

(71) Applicant: Microsoft Technology Licensing, LLC, Redmond, WA (US)

(72) Inventors: Nicole Berdy, Kirkland, WA (US); Konstantin Dotchkoff, Redmond, WA (US); Arjmand Samuel, Redmond, WA (US); Affan Dar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 15/294,675

(22) Filed: Oct. 14, 2016

(65) Prior Publication Data

US 2018/0109395 A1   Apr. 19, 2018

(51) Int. Cl.
| | |
|---|---|
| *G06F 15/16* | (2006.01) |
| *H04L 12/28* | (2006.01) |
| *H04W 4/50* | (2018.01) |
| *H04L 29/06* | (2006.01) |
| *H04W 64/00* | (2009.01) |

(Continued)

(52) U.S. Cl.
CPC ...... *H04L 12/2809* (2013.01); *H04L 63/0428* (2013.01); *H04L 63/08* (2013.01); *H04L 63/0823* (2013.01); *H04W 4/50* (2018.02); *H04W 4/70* (2018.02); *H04W 64/003* (2013.01); *H04W 4/02* (2013.01); *H04W 12/06* (2013.01); *H04W 48/20* (2013.01)

(58) Field of Classification Search
CPC . H04L 12/2809; H04L 63/0428; H04L 63/08; H04L 63/0823; H04W 4/70; H04W 4/50; H04W 64/003; H04W 4/02; H04W 12/06; H04W 48/20

USPC .......................................................... 709/222
See application file for complete search history.

(56) References Cited

U.S. PATENT DOCUMENTS

| | | |
|---|---|---|
| 6,993,038 B2 | 1/2006 | McCann |
| 7,644,145 B2 | 1/2010 | Rockwell |

(Continued)

FOREIGN PATENT DOCUMENTS

| | | |
|---|---|---|
| CN | 101860978 A | 10/2010 |
| CN | 103227813 A | 7/2013 |

(Continued)

OTHER PUBLICATIONS

"Device provisioning concepts", Retrieved on: Aug. 11, 2016 Available at: https://mobilefirstplatform.ibmcloud.com/tutorials/en/foundation/6.3/authentication-security/device-provisioning-concepts/.

(Continued)

*Primary Examiner* — Melvin H Pollack
(74) *Attorney, Agent, or Firm* — Davin Chin; Chin IP, PLLC

(57) ABSTRACT

The disclosed technology is generally directed to device provisioning in an IoT environment. For example, such technology is usable in provisioning IoT devices to an IoT Hub. In one example of the technology, an identification message that includes information associated with identification of a first IoT device is received. The validity of the first IoT device is then verified. After the first IoT device is verified, based at least in part on the identification message, an IoT hub is selected from a plurality of IoT hubs. The first IoT device is then caused to be registered with the selected IoT hub.

20 Claims, 8 Drawing Sheets

(51) Int. Cl.
*H04W 4/70* (2018.01)
*H04W 4/02* (2018.01)
*H04W 12/06* (2009.01)
*H04W 48/20* (2009.01)

(56) References Cited

U.S. PATENT DOCUMENTS

| | | | |
|---|---|---|---|
| 8,392,712 | B1 | 3/2013 | Wilson |
| 9,177,122 | B1 | 11/2015 | Trier |
| 9,325,575 | B2 | 4/2016 | Gray et al. |
| 9,590,857 | B2* | 3/2017 | Lee .................. H04L 45/02 |
| 9,762,556 | B2* | 9/2017 | James ............. H04L 63/0442 |
| 9,838,390 | B2* | 12/2017 | Zakaria ................ H04W 4/70 |
| 9,847,964 | B2* | 12/2017 | Logue ................. F24F 11/30 |
| 9,858,213 | B2* | 1/2018 | Britt .................. G06F 21/64 |
| 9,948,506 | B2* | 4/2018 | Yin .................. H04L 41/0806 |
| 9,967,728 | B2* | 5/2018 | Logue ................. H04W 8/005 |
| 9,974,015 | B2* | 5/2018 | Zakaria ................ H04L 67/12 |
| 9,977,415 | B2* | 5/2018 | Zimmerman ........ H04L 67/10 |
| 9,978,237 | B2* | 5/2018 | Britt .................. G08B 19/00 |
| 9,992,520 | B2* | 6/2018 | Williamson ........ H04L 9/0825 |
| 10,044,674 | B2* | 8/2018 | Liu .................. H04W 12/06 |
| 10,045,150 | B2* | 8/2018 | Zakaria .............. H04W 4/023 |
| 2013/0031224 | A1 | 1/2013 | Nachtrab et al. |
| 2013/0041997 | A1 | 2/2013 | Li et al. |
| 2013/0094444 | A1 | 4/2013 | Lai et al. |
| 2014/0241373 | A1 | 8/2014 | Pasam et al. |
| 2015/0156266 | A1 | 6/2015 | Gupta |
| 2015/0222621 | A1 | 8/2015 | Baum et al. |
| 2015/0382198 | A1 | 12/2015 | Kashef et al. |
| 2016/0081133 | A1 | 3/2016 | Kim et al. |
| 2016/0156614 | A1 | 6/2016 | Jain et al. |
| 2016/0182459 | A1 | 6/2016 | Britt et al. |
| 2016/0195859 | A1 | 7/2016 | Britt et al. |
| 2016/0205078 | A1 | 7/2016 | James et al. |
| 2016/0205106 | A1 | 7/2016 | Yacoub et al. |
| 2016/0212099 | A1 | 7/2016 | Zou et al. |
| 2016/0227371 | A1* | 8/2016 | Wang .................. H04W 4/023 |
| 2016/0364223 | A1 | 12/2016 | Vandikas et al. |
| 2017/0033984 | A1 | 2/2017 | Lear et al. |
| 2017/0070563 | A1* | 3/2017 | Sundermeyer ........ H04L 67/025 |
| 2017/0099353 | A1 | 4/2017 | Arora et al. |
| 2017/0141968 | A1 | 5/2017 | Lloyd et al. |
| 2017/0251026 | A1* | 8/2017 | Straub .................. H04L 65/102 |
| 2017/0257257 | A1* | 9/2017 | Dawes .................. H04L 67/025 |
| 2017/0264613 | A1 | 9/2017 | Phillips et al. |
| 2017/0272316 | A1* | 9/2017 | Johnson .................. H04L 41/28 |
| 2018/0054490 | A1 | 2/2018 | Wadhwa et al. |
| 2018/0081666 | A1 | 3/2018 | Surdu |
| 2018/0091506 | A1* | 3/2018 | Chow .................. H04L 67/2838 |
| 2018/0152420 | A1* | 5/2018 | Britt .................. H04L 63/0428 |
| 2018/0181649 | A1* | 6/2018 | Matsuoka ............ G05B 13/027 |
| 2018/0198688 | A1* | 7/2018 | Dawes .................. H04L 41/22 |
| 2018/0198756 | A1* | 7/2018 | Dawes .................. H04L 63/02 |
| 2018/0270276 | A9* | 9/2018 | Logue ................. H04L 65/1069 |

FOREIGN PATENT DOCUMENTS

| | | |
|---|---|---|
| CN | 103929746 A | 7/2014 |
| EP | 3043535 A1 | 7/2016 |
| WO | 2002006973 A1 | 1/2002 |
| WO | 2012092864 A1 | 7/2012 |
| WO | 2016020950 A1 | 2/2016 |

OTHER PUBLICATIONS

"International Search Report and Written Opinion Issued in PCT Application No. PCT/US2017/055680", dated Jan. 4, 2018, 12 Pages.

"Internet of Things: Role of Oracle Fusion Middleware", In White Paper of Oracle, Apr. 2014, 28 pages.

"IoT Core manufacturing guide", Retrieved on: Aug. 8, 2016 Available at: https://msdn.microsoft.com/en-us/windows/hardware/commercialize/manufacture/iot/iot-core-manufacturing-guide.

"Manage IoT Core device updates", Retrieved on: Aug. 8, 2016 Available at: https://msdn.microsoft.com/en-us/windows/hardware/commercialize/service/iot/managing-iot-device-update.

Betts, et al., "What is Azure IoT Hub?", Retrieved on: Aug. 8, 2016 Available at: https://azure.microsft.com/en-us/documentation/articles/iot-hub-what-is-iot-hub/.

Elkhodr, et al., "A Middleware for the Internet of Things", In International Journal of Computer Networks & Communications, vol. 8, No. 2, Mar. 2016, pp. 159-178.

Nicole Berdy et al.; "Automatic Provisioning of Iot Devices"; U.S. Appl. No. 15/294,679, filed Oct. 15, 2016; 34 pages.

Wang, Yingmei, "Middleware Technology Research and Interface Design Based on Internet of Things", In International Journal of Smart Home, vol. 9, No. 12, Dec. 2015, pp. 35-44.

"International Search Report and Written Opinion Issued in PCT Application No. PCT/US2017/055679", dated Jan. 16, 2018, 11 Pages.

Wang, Yingmei, "Middleware Technology Research and Interface Design Based on Internet of Things", In International Journal of Smart Home, vol. 9, No. 12, Dec. 2015, 10 pages.

"Device provisioning concepts", Retrieved on: Aug. 8, 2016 Available at: https://mobilefirstplatform.ibmcloud.com/tutorials/en/foundation/6.3/authentication-security/device-provisioning-concepts/.

Waher, Peter, "XEP-0324: Internet of Things—Provisioning", Published on: Jul. 2, 2014 Available at: http://xmpp.org/extensions/xep-0324.html.

"Non-Final Office Action Issued in U.S. Appl. No. 15/294,679", dated Jan. 25, 2019, 17 Pages.

"Final Office Action Issued in U.S. Appl. No. 15/294,679", dated Jul. 9, 2019, 17 Pages.

* cited by examiner

IOT PROVISIONING SERVICE

BACKGROUND

The Internet of Things ("IoT") generally refers to a system of devices capable of communicating over a network including the communications of data over the network. The devices can include everybody objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to device provisioning in an IoT environment. For example, such technology is usable in provisioning IoT devices to an IoT hub. In one example of the technology, an identification message that includes information associated with identification of a first IoT device is received. The validity of the first IoT device is then verified. After the first IoT device is verified, based at least in part on the identification message, an IoT hub is selected from a plurality of IoT hubs. The first IoT device is then caused to be registered with the selected IoT hub.

In some examples, the provisioning service is a globally available cloud service that acts as a global endpoint for IoT devices to connect to on the front end upon first boot, has connections to multiple cloud solutions on the backend, and uses routing rules to make sure that IoT devices are provisioned to the appropriate IoT solution. Multiple types of hardware/operating system (OS) combinations may connect to the same global endpoint, as opposed to being specific to hardware and only connecting to one backend solution. In some examples, all connections to and from the provisioning service are secured. Also, multiple IoT solutions may be connected to by one provisioning service.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
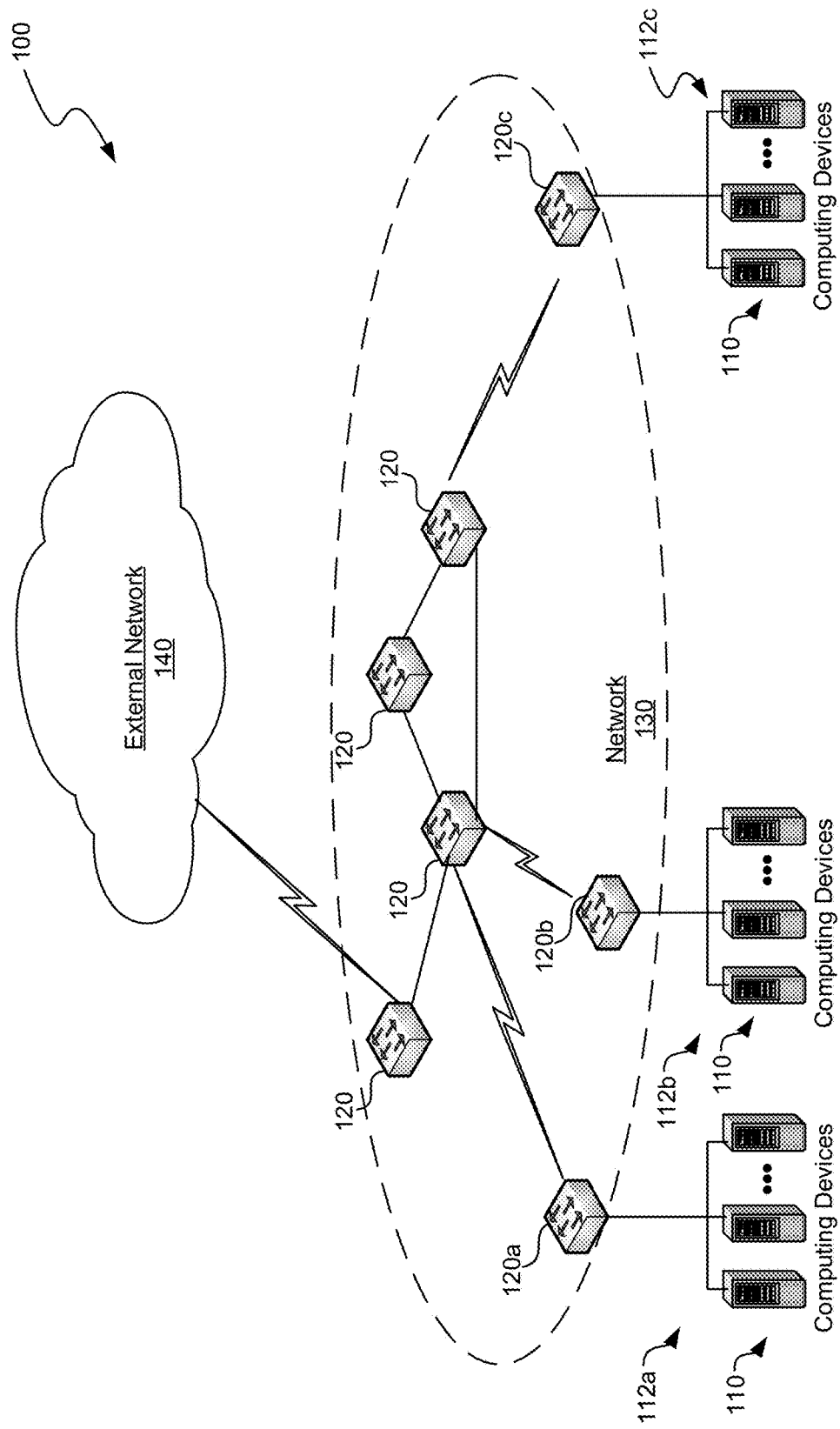
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to device provisioning in an IoT environment. For example, such technology is usable in provisioning IoT devices to an IoT hub. In one example of the technology, an identification message that includes information associated with identification of a first IoT device is received. The validity of the first IoT device is then verified. After the first IoT device is verified, based at least in part on the identification message, an IoT hub is selected from a plurality of IoT hubs. The first IoT device is then caused to be registered with the selected IoT hub.

While mass producing IoT devices, an IoT hub endpoint along with credentials are not typically hard-coded into the IoT device, because, for example, the device manufacturer might not know how the device will be used. In addition, correct provisioning may involve information that was not available at the time that the device was manufactured. Provisioning may be used as part of the lifecycle management of an IoT device that enables seamless integration with an IoT solution. Technically speaking, provisioning may pair IoT devices with a cloud backend based on a number of characteristics such as: the location of the device, the customer who bought the device, and the application in which the device is to be used.

In some examples of the disclosure, the lifecycle of an IoT device may include: creating the device identity in the IoT solution, sending telemetry from the IoT device to the IoT solution cloud backend, updating the IoT device based on new information (reacting to insights, updating to new firmware, etc.), decommissioning the IoT device at its end of life, blacklisting compromised devices, and deleting the IoT device from the IoT solution.

In some examples, the provisioning service performs the lifecycle step of creating the device identity in the IoT device, which involves establishing the initial connection between IoT devices and the IoT solution via provisioning a device identity on an IoT hub.

Other technologies that establish the initial connection between an IoT device and the IoT solution may: be tied to a specific type of hardware and do not go across different types of hardware and also do not integrate with cloud back-ends.

Some examples of the disclosure provide a provisioning service that is a globally available cloud service that acts as a single global endpoint for IoT devices to connect to on the front end, has connections to multiple cloud solutions on the backend, and uses routing rules to make sure that IoT devices are provisioned to the appropriate IoT solution. In some examples, the provisioning service is a globally available cloud service that acts as a global endpoint in the cloud; in other examples, the provisioning service is an endpoint within a user's subscription per service endpoint. The provisioning service selects an IoT hub from among multiple IoT hubs, and provisions the IoT device to the selected IoT hub. The provisioning service may enable the seamless creation of its digital twin in IoT services. Multiple types of hardware/operating system (OS) combinations may connect to the same global endpoint, as opposed to being specific to hardware and only connecting to one backend solution. In some examples, all connections to and from the provisioning service are secured. Also, multiple IoT solutions may be connected to by one provisioning service.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices no may be individually configured to provide computing, storage, and/ or other suitable computing services.

In some examples, one or more of the computing devices 110 is an IoT device, a mobile provisioning application device, cloud-to-cloud identity attester, a device that comprises part or all of an IoT hub, a device comprising part or all of a provisioning service, or the like, as discussed in greater detail below.

Illustrative Computing Device

Figure 2:
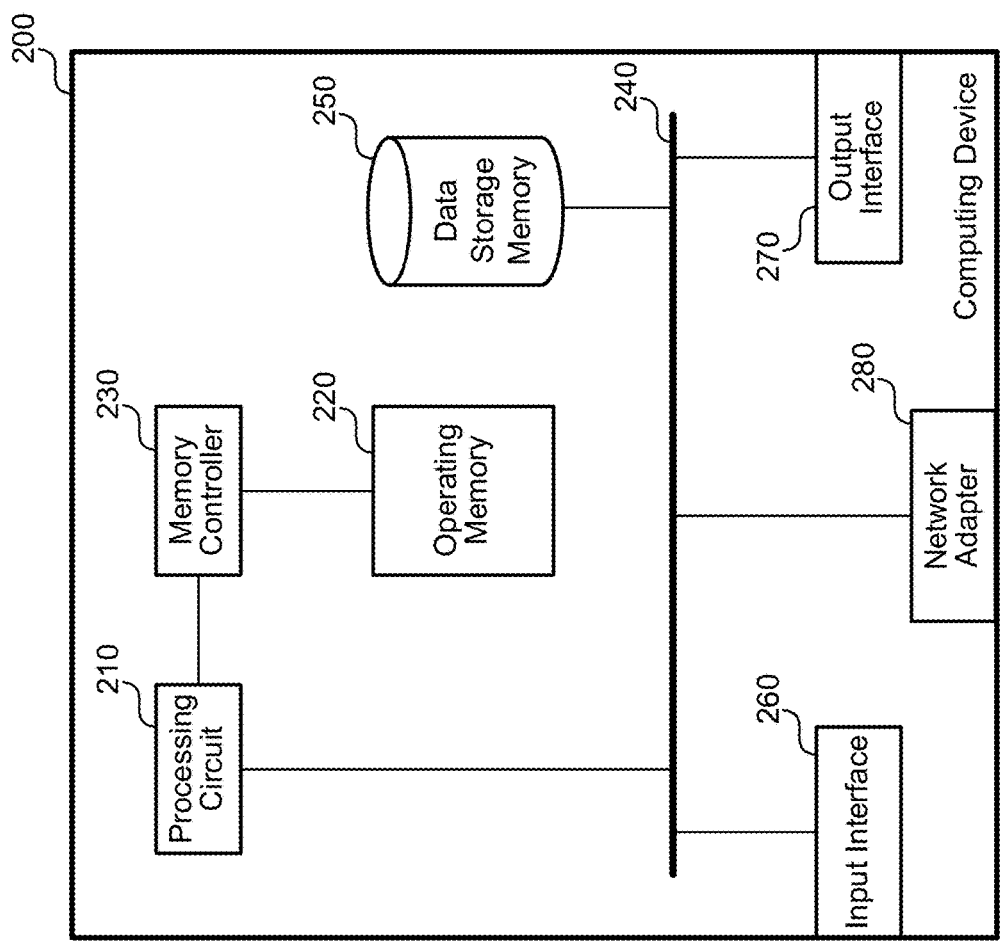
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in FIGS. 5-7, as discussed in greater detail below. As illustrated in FIG. 2, computing device 200 includes processing circuit 210, operating memory 220, memory controller 230, data storage memory 250, input interface 260 output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate ($DDR_4$) memory, 3rd generation double data rate ($DDR_3$) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions. In some examples, computing device 200 is enabled to perform actions such as the actions in process 800 or process 900 below, or actions in a process performed by one or more of the computing devices in FIG. 3 below.

Illustrative System

Figure 3:
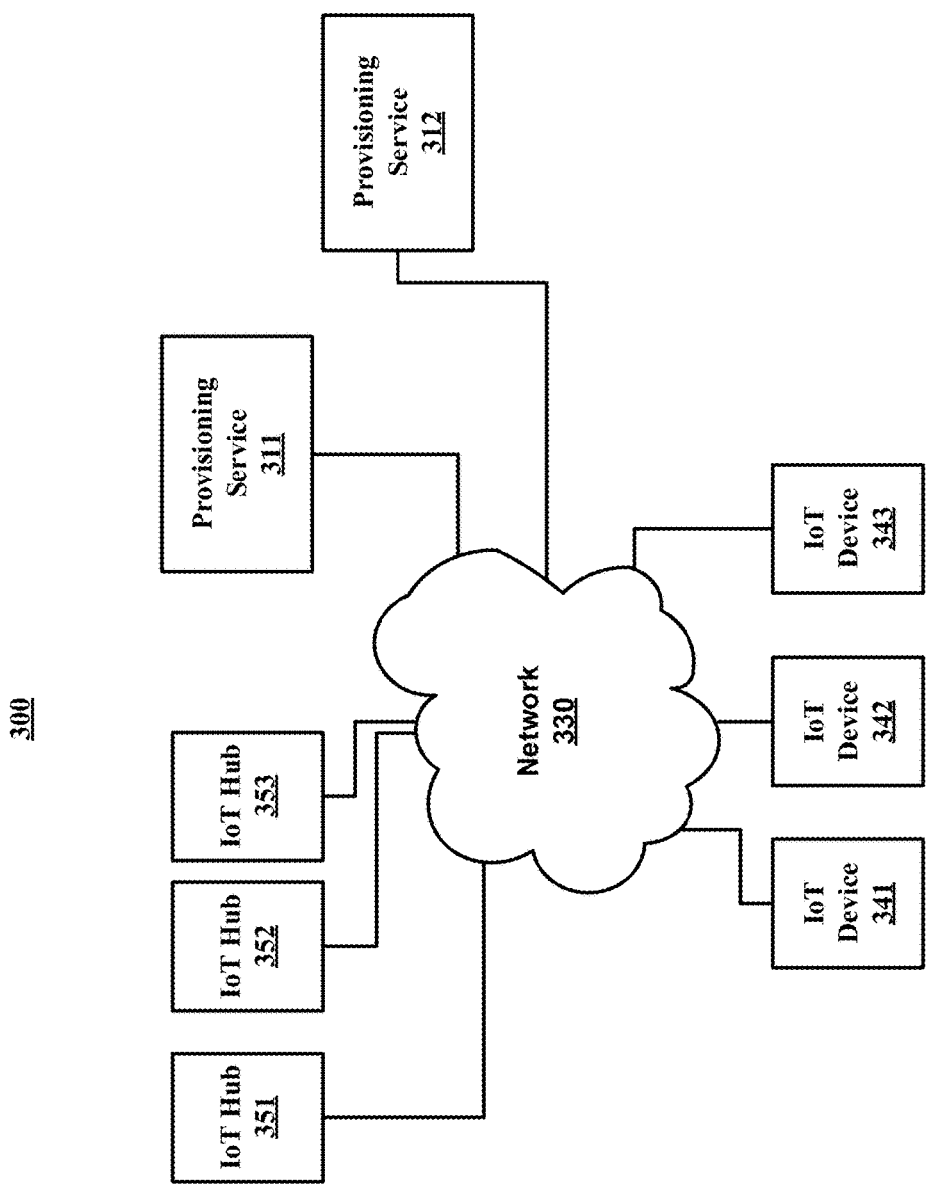
FIG. 3 is a block diagram illustrating an example of a system for IoT communications.

FIG. 3 is a block diagram illustrating an example of a system (300) for IoT communications. System 300 may include network 330, IoT hubs 351-353, IoT devices 341-343, and provisioning services 311-312, which all connect to network 330. The term "IoT device" refers to a device intended to make use of IoT services. An IoT device can include virtually any device that connects to the cloud to use IoT services, including for telemetry collection or any other purpose. Each of the provisioning services 311-312 includes one or more devices, such as a distributed system in some examples. The term "IoT hub" refers to a device, or multiple devices such as a distributed system, to which IoT devices connect on the network for IoT services after provisioning. Each of the IoT devices 341-343 and/or the devices that comprise IoT hubs 351-353 and provisioning services 311-312 may include examples of computing device 200 of FIG. 2. The term "IoT hub" is not limited to one particular type of IoT service, but refers to the device to which the IoT device communicates, after provisioning, for any type of IoT solution or IoT service. That is, the term "IoT hub," as used throughout the specification and the claims, is generic to any IoT solution. FIG. 3 and the corresponding description of FIG. 3 in the specification illustrates an example system for illustrative purposes that does not limit the scope of the disclosure.

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT hubs 351-353, IoT devices 341-343, and provisioning services 311-312.

As one example, IoT devices 341-343 are devices that are intended to make use of IoT services provided by one or more IoT hubs, such as IoT hubs 351-353. Provisioning service 311-312 are devices or sets of devices (such as distributed systems) that perform actions in provisioning an IoT device to an IoT hub.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
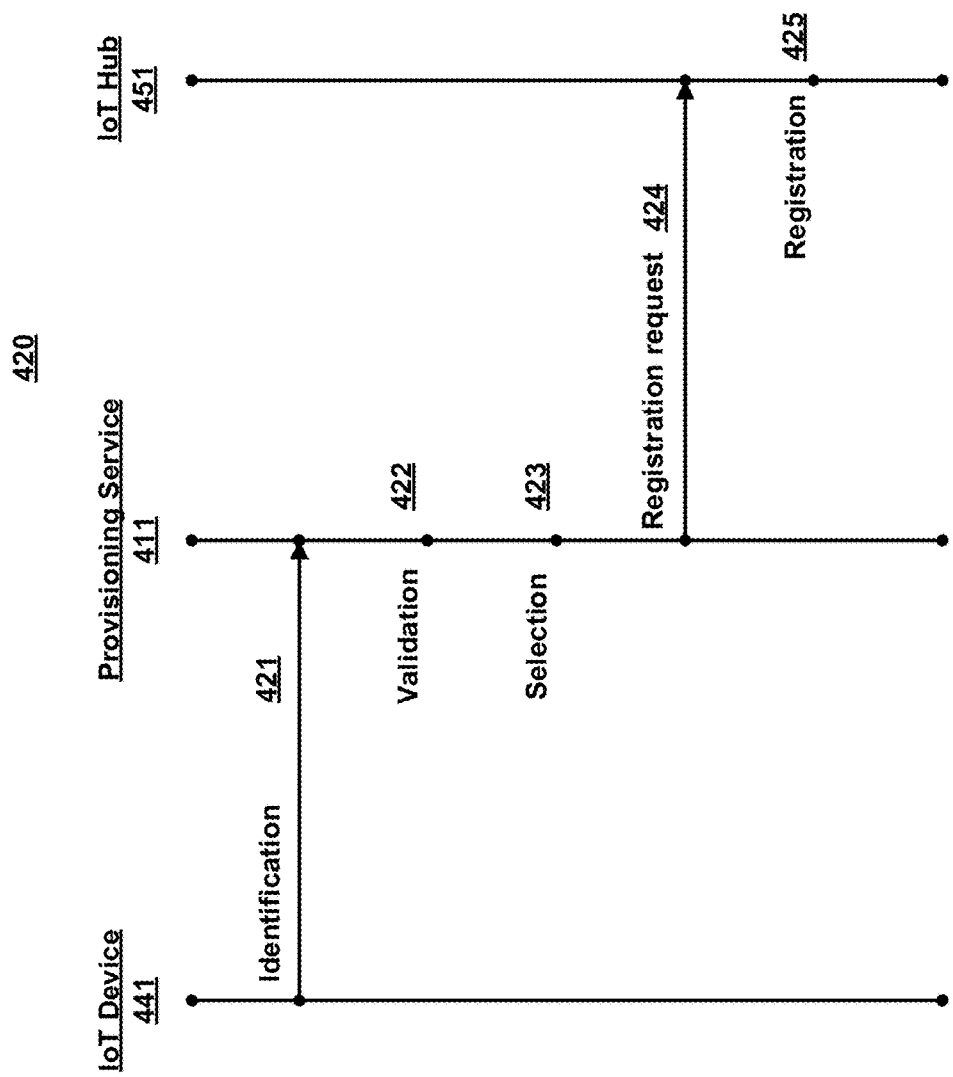
FIG. 4 is a diagram illustrating an example dataflow for a process for IoT communications.

FIG. 4 is a diagram illustrating an example dataflow for a process (420) for IoT communications. FIG. 4 and the corresponding description of FIG. 4 in the specification illustrates an example process for illustrative purposes that does not limit the scope of the disclosure.

In some examples, IoT device 441 and provisioning service 411 have the following starting point. First, IoT device 441 stores the endpoint it is to connect with in order to be automatically provisioned. For instance, the endpoint uniform resource indicator (URI) may be installed in the factory. In some examples, on first power-up and first boot-up, IoT device 441 is cryptographically guaranteed to connect to provisioning service 411 only. Also, IoT device 441 stores identity information about itself as well as optional metadata, which may include geolocation, in some examples. Further, provisioning service 411 may have some method to verify the identity of IoT device 441. The source used to verify the identity of IoT device 411 may provide provisioning service 411 with additional metadata. Provisioning service 411 may also contain a rule engine used to route an IoT device's provisioning request to the correct IoT hub. For example, one rule may be for all IoT devices within a certain geographic region to be provisioned to an IoT solution located in a certain region. Provisioning service 411 may be configured with information about how to connect a device to one or more IoT hubs each corresponding to a separate IoT solution.

In the illustrated examine, upon IoT device 441 first being powered on by a customer, step 421 occurs. At step 421, an identification message may be communicated from IoT device 441 to provisioning service 411. In some examples, IoT device 441 communicates the identification message directly to provisioning service 411. In other examples, the identification message is communicated from IoT device 441 to provisioning service 411 through one or more intermediary devices, such as a mobile provisioning application device, cloud-to-cloud identity attester, or the like, as discussed in greater detail below.

In some examples, IoT device 441 is manufactured with the URI of provisioning service 411. In some of these examples, step 421 happens upon IoT device 441 first being powered on. Upon IoT device 441 first being powered on, IoT device 441 may send the identification message to provisioning service 411 via the URI of provisioning service 441.

The identification information includes information that is usable for verifying that IoT device 441 is a valid device to receive IoT services, and may also include information for determining which IoT solution is appropriate for IoT device 441, such as geographical information.

As shown, step 422 occurs next. At step 422, the provisioning service determines whether or not IoT device 441 is valid. The validity determination is made in different ways in different examples, which will be discussed in greater detail below. If the provisioning service determines that IoT device 441 is not valid, the process ends.

If, instead, provisioning service 411 determines that IoT device 441 is valid, step 423 occurs. At step 423, provisioning service 411 selection an IoT hub from a plurality of IoT hubs. In some examples, the selection of the IoT hub is based on routing rules. In some examples, geographical location may be a factor in the selection of the IoT hub. For example, the closest appropriate IoT hub may be selected in some examples. Another factor in the selection of the IoT hub may be dependent on which IoT solution is appropriate based on factors relevant to the IoT device and determined by the IoT device manufacturer. For example, all smart building IoT devices from a manufacturer may use a particular IoT solution and therefore select the corresponding IoT hub, while smart toasters from that manufacturer may go to a different IoT solution and therefore select the corresponding IoT hub.

In this example, step 424 occurs next. At step 424, a request to register IoT device 441 may be communicated from provisioning service 411 to the selected IoT hub (IoT hub 451). In some examples, the request to register IoT device 441 includes connection information associated with IoT device 441. Next, step 425 occurs. At step 425, IoT hub 451 may register IoT device 441 in a device registry in IoT hub 451. In some examples, IoT hub 451 registers IoT device 441 in both a device identity registry and a device management registry. In other examples, the device identity registry and the device management registry are combined, and IoT hub 451 registers IoT device 441 in one registry rather than two. Accordingly, in some examples, the device registry is at least one of a device identity registry, a device management registry, a device identity registry and a device management registry, or a combined device registry. As part of the registration at step 425, in some examples, IoT hub 451 creates a separate ID for IoT device 441. By creating a separate ID for IoT device 441, IoT hub has an ID for IoT device 441 that maps to IoT device 441 so that IoT hub 451 can properly communicate with IoT device 441.

Although not shown in FIG. 4, in some examples, next, cryptographic information about IoT device 441 is communicated from IoT hub 451 to provisioning service 411, and in turn the cryptographic information about IoT device 441 is communicated from provisioning service 411 to IoT device 441. As part of this communication, IoT hub 451 may queue up commands for IoT device 441, or queue up commands to be sent for IoT device 441 to complete subsequently. This completes the provisioning process in this example. The cryptographic information may also include credentials, the hostname of the selected IoT hub 451, connectivity information required for IoT device 441 to connect with IoT hub 451, and the like. In other examples, the provisioning process completes in some other manner, or is complete with step 425.

After provisioning is complete, in some examples, communications between IoT device 441 and IoT hub 451 may occur directly and in a normal fashion, and provisioning service 411 are not again involved in communications between IoT device 441 and IoT hub 451, unless, in some examples, IoT device 441 needs to be re-provisioned. In some examples, IoT device 441 sends an initial message to IoT hub 451, such as a welcome packet or the like, and IoT hub 451 returns a message to IoT device 441 with steps that IoT device 441 needs to follow before IoT device 441 may begin sending data to IoT hub 451, such as updating the firmware of IoT device 441, changing a configuration file, and/or the like.

In some examples, IoT device 441 retains cryptographic memory of provisioning service 411 and can be redirected to provisioning service 411 during the lifetime of IoT device 441 in order to re-provision IoT device 411. In some examples, certain events may cause IoT device 441 to initiate re-provisioning, such as IoT device 441 being resold, a change in geographical regions, or the like.

In some examples, re-provisioning of an IoT device may be performed as follows. First, a determination is made as to which new IoT hub the IoT device should be attached to (in base data). Next, the IoT device is provisioned in the new IoT hub. Then, the new connection information is returned. The IoT device is then deleted from the registry of the old IoT hub.

In some examples, as a security measure, provisioning service 411 may be restricted from directly connecting to a device without first being contacted by that device. In other examples, provisioning service 411 can directly connect to IoT device 441 without being contacted by IoT device 441, and the security is ensured in some other manner.

Figure 5:
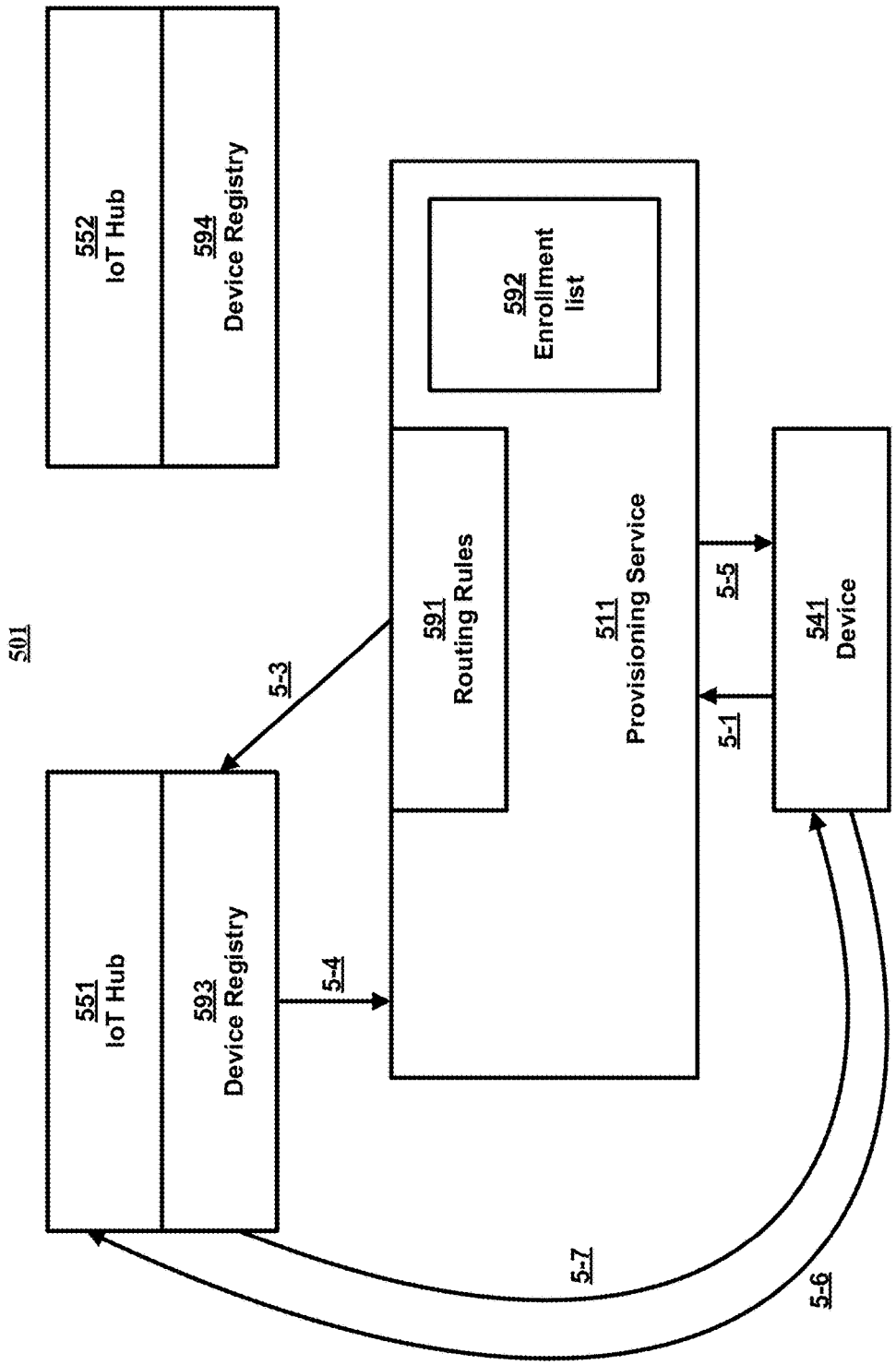
FIG. 5 is a block diagram illustrating an example of a portion of the system of FIG. 3.

FIG. 5 is a block diagram illustrating an example of a portion (501) of system 300 of FIG. 3. Portion 501 includes IoT device 541, provisioning service 511, and IoT hubs 551 and 552. As shown, provisioning service 511 includes routing rules 591 and enrollment list 592. Also, IoT hub 551 includes device registry 593 and IoT hub 552 includes device registry 594.

In some examples, IoT device 541 is manufactured with the URI of provisioning service 511 installed therein.

In some examples, IoT device 541 is also manufactured with identification information for IoT device 541 installed therein. In some of these examples, IoT device 541 is also manufactured with other manufacturer set data. The identification information may include the device identity (ID), the manufacturer set data, and, in some examples, base data including other information that may be relevant in terms of selecting an IoT solution, such as geographical data. In some examples, the device ID is known by the manufacturer of the device.

In some examples, the manufacturer makes a list of device ideas for IoT devices eligible to use the IoT services available to provisioning service 511 via an uploaded file, or the like, so that the device ID of each IoT device can be validated.

At step 5-1, IoT device 541 contacts the provisioning service endpoint (of provisioning service 511) set at the factory. The device ID and, optionally, other manufacturer-set data are passed as part of the call.

Next, at step 5-2, provisioning service 511 ascertains the validity of IoT device 541 by validating the device ID and, optionally, other manufacturer-set data against the uploaded base data. In some examples, provisioning service 511 also looks up IoT device 541 in the source of base data to find out metadata/hub data about IoT device 541 if such data is present.

The validation at step 5-2 may be performed in different ways in different examples. In some examples, enrollment list 592 may include all devices built by a manufacturer that uses one or more IoT solutions associated with the provisioning service that have been programmed with provisioning service 511 as the endpoint to use on first boot up. In other examples, enrollment list 592 may include only devices sold, not all devices built, that use provisioning service 511 as the endpoint for provisioning. In some examples, provisioning service 511 verifies the identity by determining whether or not the provided device ID is a device ID included in enrollment list 592. In some examples, other steps are necessary to confirm the device identity. For example, other data provided by IoT device 541 may also be used in the verification.

Next, at step 5-3, provisioning service 511 runs routing rules over the data from IoT device 541 as well as data from the base data source to find the right IoT hub to register IoT device 541 with. Provisioning service 511 registers IoT device 541 with the selected IoT hub's (551) identity registry and device management (DM) registry. In some examples, instead of two separate registries, there is one device registry to which IoT device 541 is registered.

Next, at step 5-4, IoT hub 551 returns cryptographic information about IoT device 541 to provisioning service 511.

Next, at step 5-5, provisioning service 511 returns the cryptographic information to IoT device 541.

IoT device 541 can now send data directly to IoT hub 551 at step 5-6.

Next, at step 5-7, the metadata of IoT device 541 syncs with the metadata stored in the IoT hub's (541) device management (DM) registry via DM syncing.

Figure 6:
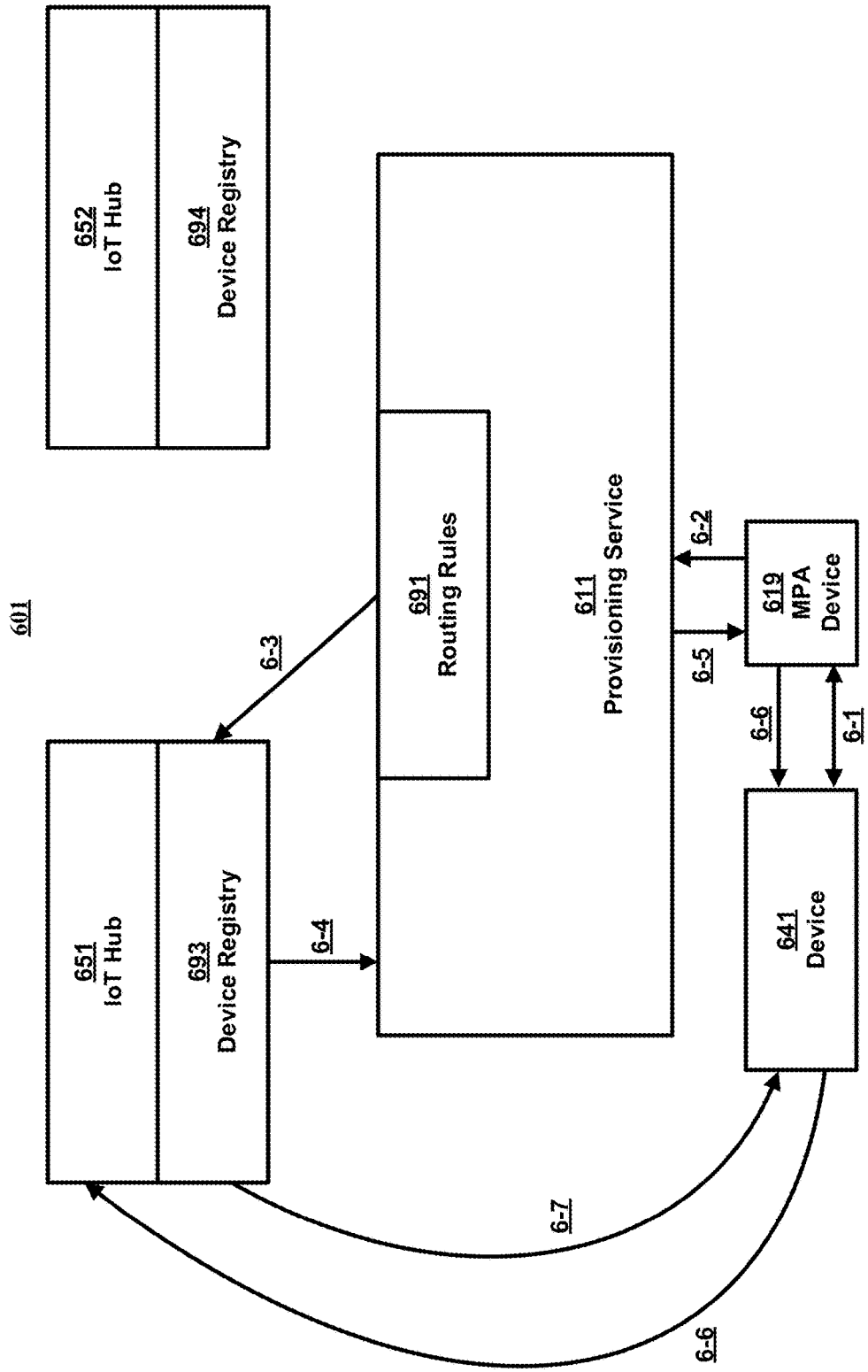
FIG. 6 is a block diagram illustrating another example of a portion of the system of FIG. 3.

FIG. 6 is a block diagram illustrating an example of a portion (601) of system 300 of FIG. 3. Portion 601 includes IoT device 641, provisioning service 611, trusted mobile provisioning application (MPA) device 619, and IoT hubs 651 and 652. As shown, provisioning service 611 includes routing rules 691. Also, IoT hub 651 includes device registry 693 and IoT hub 652 includes device registry 694.

In some examples, IoT device 641 is manufactured with a secure device identity available via NFC or similar technology. In the example illustrated in FIG. 6, this is the root of trust of IoT device 641.

In some examples, IoT device 641 is also manufactured with additional information available via NFC or similar technology, and a programmable interface to uploading IoT Hub device credentials onto IoT device 641.

In some examples, trusted mobile provisioning application device 619 has a method of reading the device identity of the device via NFC or similar technology, and a way to input additional metadata about the device, such as floor within a building. In some examples, trusted mobile provisioning application device 619 also has a trusted connection to provisioning service 611.

In some examples, the MPA operator enters metadata about the IoT device 641 into MPA device 619 before initializing provisioning.

At step 6-1, MPA device 619 scans IoT device 641 during installation.

Next, at step 6-2, MPA device 619 contacts the provisioning service endpoint (of provisioning service 611) with information from the IoT device (641) scan as well as information input by the MPA operator.

Next, at step 6-3, provisioning service 611 ascertains the validating of the MPA connection. Provisioning service 611 runs routing rules over the data from MPA device 619 to find the right IoT hub to register IoT device 641 with. Provisioning service 611 registers IoT device 641 with the IoT hub's (651) identity registry and DM registry, or with one device registry in some examples.

Next, at step 6-4, IoT hub 651 returns cryptographic information about IoT device 641 to provisioning service 611.

Next, at step 6-5, provisioning service 611 returns the cryptographic information to MPA device 619.

Next, at step 6-6, MPA device 619 passes the cryptographic information along to IoT device 641 via the programmable interface of IoT device 641.

IoT device 641 can now send data directly to IoT hub 651 at step 6-7.

Next, at step 6-8, the metadata of IoT device 641 syncs with the metadata stored in the DM registry of IoT hub 651 via DM syncing.

Although not shown in FIG. 6, some examples of portion 601 may be used for cloud-to-cloud implementations with cloud-to-cloud device identity attestation. In some examples, the example illustrated in FIG. 6 and discussed above is functionally equivalent to what is required for C2C device identity attestation providers to connect their systems to IoT service, replacing "mobile provisioning application device" with "Cloud-to-cloud identity attester."

Figure 7:
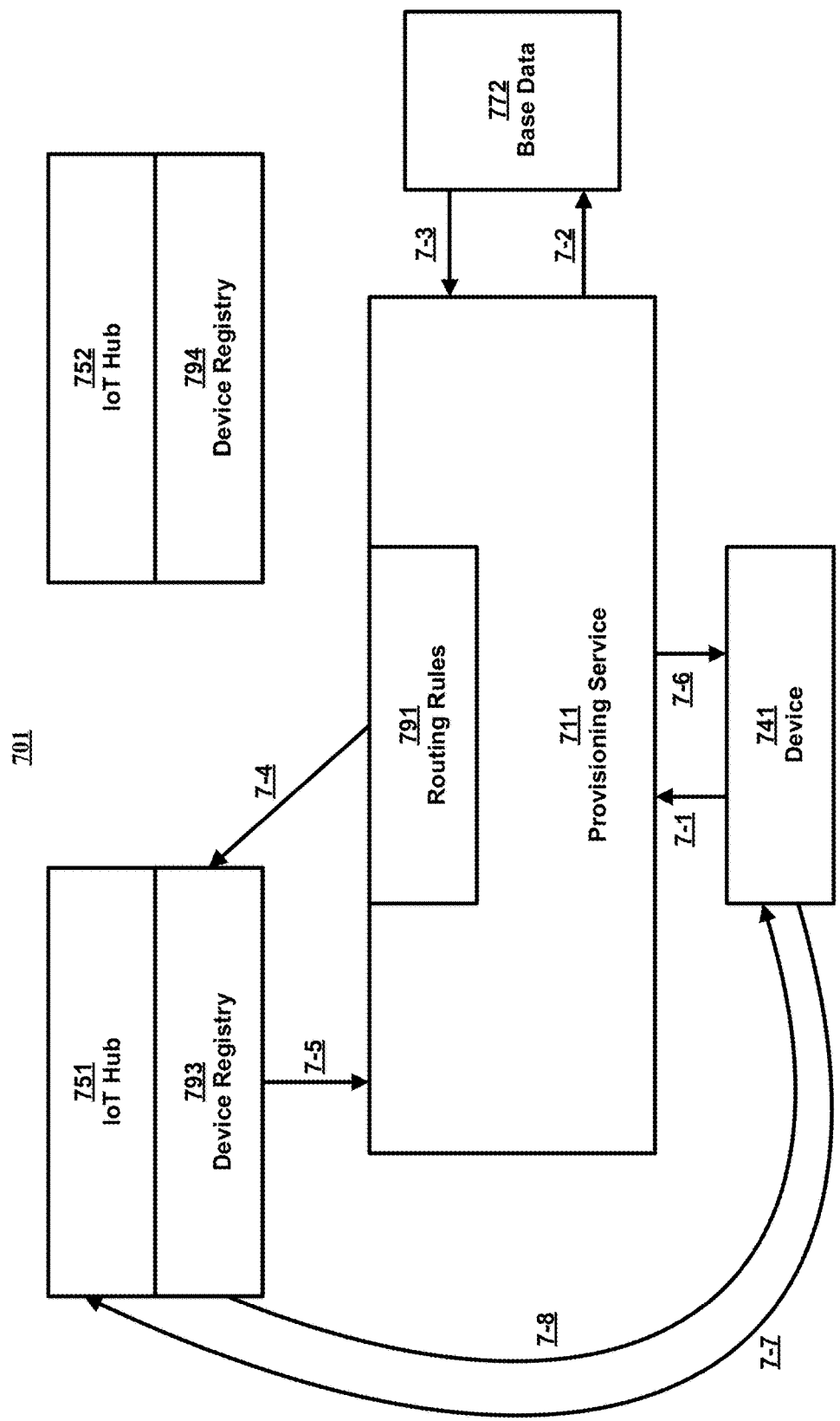
FIG. 7 is a block diagram illustrating yet another example of a portion of the system of FIG. 3.

FIG. 7 is a block diagram illustrating an example of a portion (701) of system 300 of FIG. 3. Portion 701 includes IoT device 741, provisioning service 711, source of base data 771, and IoT hubs 751 and 752. As shown, provisioning service 711 includes routing rules 791. Also, IoT hub 751 includes device registry 793 and IoT hub 752 includes device registry 794.

In some examples, a private key (from the private/public key pair) is stored in IoT device 741 in secure storage on IoT device 741 (via Trusted Platform Module or other similar technology). In the example illustrated in FIG. 7, this is the root of trust of IoT device 741.

Also, in some examples, IoT device 741 stores an X509 certificate containing the URI of provisioning service 711. In some examples, the X509 certificate also contains the device ID of IoT device 741 and other device metadata for IoT device 641.

The signature of the X509 certificate is accomplished using the private key in a secure process. In some examples, the X509 certificate is generated at provisioning time, and in other examples, the X509 certificate is generated at manufacture time. The public key (from the private/public key pair) is made available to the provisioning service to validate the certificate signature.

At step 7-1, IoT device 741 contacts the endpoint of provisioning service 711, where the endpoint is set at the factory. The end point is extracted from the X509 certificate, and the signature along with the X509 certificate are passed as part of the call.

At step 7-2, provisioning service 711 ascertains the validating of the X509 certificate by calculating the signature using the public key and comparing with the supplied signature. Provisioning service 711 also looks up the IoT device 741 in the source of base data to find out metadata/ hub data about the IoT device 741.

At step 7-3, provisioning service 711 runs routing rules over the data from IoT device 741 as well as data from the base data source to find the right IoT hub to register IoT device 741 with.

At step 7-4, provisioning service 711 registers IoT device 741 with the device identity registry and device management (DM) registry of IoT hub, or instead to a single device registry in some examples.

At step 7-5, IoT hub 751 returns cryptographic information about IoT device 741 to provisioning service 711.

At step 7-6, provisioning service 711 returns the cryptographic information to IoT device 741. All subsequent calls are between IoT device 741 and IoT hub 751. IoT device 741 can now start sending data directly to IoT hub 751.

At step 7-7, IoT device 741 can now send data to IoT hub 751.

At step 7-8, the metadata of IoT device 741 syncs with the metadata stored in the DM registry of IoT hub 751 via DM syncing.

Figures 8, 9:
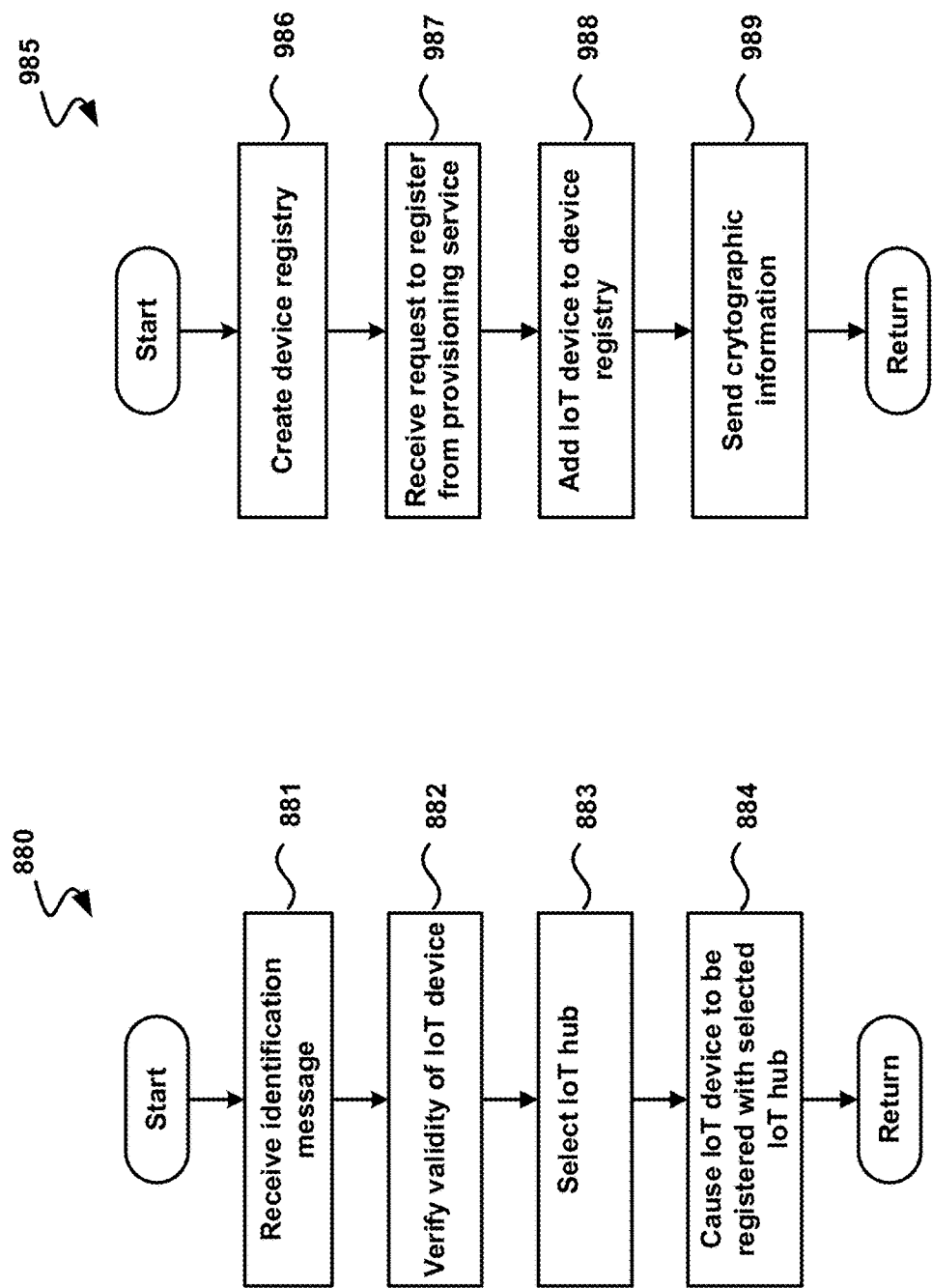
FIG. 8 is a logical flow diagram illustrating an example of a process for IoT communications.
FIG. 9 is a logical flow diagram illustrating an example of another process for IoT communications, in accordance with aspects of the present disclosure.

FIG. 8 is a logical flow diagram illustrating an example of a process (880) for IoT communications. After a start block, the process proceeds to block 881. At block 881, an identification message is received. The identification message includes information associated with identification of a first IoT device. The process then moves to block 882. At block 882, the validity of the first IoT device is verified. In some examples, verifying validity of the first IoT device includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

The process then moves to block 883. At block 883, based at least in part on the identification message, an IoT hub is selected from a plurality of IoT hubs. That is, a determination of an IoT hub from a plurality of IoT hubs to be associated with the first IoT device is made based at least in part on the identification message. The process then advances to block 884. At block 884, the first IoT device is caused to be registered with the selected IoT hub. The process then proceeds to a return block, where other processing is resumed.

FIG. 9 is a logical flow diagram illustrating an example of a process (985) for IoT communications. After a start block, the process proceeds to block 986. At block 986, a device registry is created. The process then moves to block 987. At block 987, a request is received to register a first IoT device from a provisioning service, based on network communications between the provisioning service and the IoT hub, such that a hostname of the provisioning service is a second hostname, the hostname of the IoT hub is the first hostname, and such that the second hostname is different from the first hostname.

The process then advances to block 988, where the first IoT device may be added to the device registry. The process then proceeds to block 989, where cryptographic information associated with the first IoT device is transmitted. The process then moves to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for Internet of Things (IoT) communication, comprising:
 a provisioning service including one or more devices, the devices including at least one memory adapted to store run-time data for the devices, and at least one processor that is adapted to execute processor-executable code that, in response to execution, enables the provisioning service to perform actions, including:
  receiving an identification message, wherein the identification message includes information that is associated with identification of a first IoT device;
  validating the first IoT device;
  making a determination of an IoT hub from a plurality of IoT hubs to be associated with the first IoT device based at least in part on the identification message; and
  causing a registration of the first IoT device with the determined IoT hub.

2. The apparatus of claim 1, wherein causing the registration of the first IoT device with the selected IoT hub includes sending a registration request to the determined IoT hub.

3. The apparatus of claim 1, wherein the identification information includes a device identification associated with the first IoT device and geographical information associated with the first IoT device.

4. The apparatus of claim 1, wherein validating the first IoT device includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

5. The apparatus of claim 1, wherein the action of making the determination of the IoT hub from the plurality of IoT hubs is based on routing rules, wherein the identification information includes a geographical location of the first IoT device, and wherein the action of making the determination of the IoT hub from the plurality of IoT hubs is based, in part, on the geographical location of the first IoT device.

6. The apparatus of claim 1, wherein the actions further include:
 receiving cryptographic information from the IoT hub.

7. The apparatus of claim 6, wherein the actions further include:
 sending the cryptographic information to the first IoT device.

8. The apparatus of claim 6, wherein the cryptographic information includes connectivity information associated with the first IoT device connecting to the determined IoT hub.

9. A method for Internet of Things (IoT) communication, comprising:
   receiving an identification message that includes information associated with identification of a first IoT device;
   verifying validity of the first IoT device;
   based at least in part on the identification message, selecting an IoT hub from a plurality of IoT hubs; and
   causing the first IoT device to be registered with the selected IoT hub.

10. The method of claim 9, wherein causing the first IoT device to be registered with the selected IoT hub includes sending a registration request to the selected IoT hub.

11. The method of claim 9, wherein the identification information includes a device identification associated with the first IoT device and geographical information associated with the first IoT device.

12. The method of claim 9, wherein verifying validity of the first IoT device includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

13. The method of claim 9, wherein selecting the IoT hub from the plurality of IoT hubs is based on routing rules, wherein the identification information includes a geographical location of the first IoT device, and wherein selecting the IoT hub from the plurality of IoT hubs is based, in part, on the geographical location of the first IoT device.

14. The method of claim 9, further comprising:
   receiving cryptographic information from the IoT hub.

15. The method of claim 14, further comprising:
   sending the cryptographic information to the first IoT device.

16. The method of claim 14, wherein the cryptographic information includes connectivity information associated with the first IoT device connecting to the selected IoT hub.

17. An apparatus for Internet of Things (IoT) communication, comprising:
   an IoT hub including one or more devices, the devices including at least one memory adapted to store run-time data for the devices, and at least one processor that is adapted to execute processor-executable code that, in response to execution, enables the IoT hub to perform actions, including:
   creating a device registry;
   receiving a request to register a first IoT device from a provisioning service, based on network communications between the provisioning service and the IoT hub, such that a hostname of the provisioning service is a second hostname, the hostname of the IoT hub is the first hostname, and such that the second hostname is different from the first hostname;
   adding the first IoT device to the device registry; and
   transmitting cryptographic information associated with the first IoT device.

18. The apparatus of claim 17, wherein the cryptographic information includes connectivity information associated with the first IoT device connecting to the IoT hub.

19. The apparatus of claim 17, wherein the device registry is at least one of a device identity registry, a device management registry, a device identity registry and a device management registry, or a combined device registry.

20. The apparatus of claim 17, the actions further including causing metadata stored in the first IoT device to be synced with metadata stored in the IoT hub via device management syncing.

* * * * *